United States Patent [19]

Courtney

[11] Patent Number: 5,708,965
[45] Date of Patent: Jan. 13, 1998

[54] METHOD FOR BALANCING DEMAND BETWEEN SATELLITES IN A TELECOMMUNICATIONS SYSTEM

[75] Inventor: William F. Courtney, Long Beach, Calif.

[73] Assignee: TRW Inc., Redondo Beach, Calif.

[21] Appl. No.: 640,047

[22] Filed: Apr. 30, 1996

[51] Int. Cl.[6] .................................................. H04B 7/185
[52] U.S. Cl. .................................... 455/13.4; 455/33.2
[58] Field of Search ........................ 244/158 R; 342/352;
455/12.1, 13.1, 13.4, 16, 33.1, 33.2, 33.4, 54.1, 56.1, 67.1

[56] References Cited

U.S. PATENT DOCUMENTS

| | | | |
|---|---|---|---|
| 5,212,806 | 5/1993 | Natarajan | 455/33.2 |
| 5,285,208 | 2/1994 | Bertiger et al. | 342/352 |
| 5,415,368 | 5/1995 | Horstein et al. | 455/12.1 |

*Primary Examiner*—Nguyen T. Vo
*Attorney, Agent, or Firm*—Michael S. Yatsko

[57] ABSTRACT

A method is provided for optimally assigning power load demands between satellites in a satellite constellation for a telecommunications system. The method first obtains a satellite coverage snapshot at the satellite operations center. It then identifies the satellites with overlapping coverage areas. The user clusters are then identified which are located in the overlapping coverage areas and initially assigned to one of the covering satellites which requires the least amount of power to communicate with the user clusters or randomly. The processor then balances clusters (or portions thereof) to other satellites so as to efficiently balance the power load on the satellite constellation system. The method repeats the process at regular time intervals to maintain an efficient power balance.

12 Claims, 6 Drawing Sheets

---

200 — Group user terminals into clusters based on geographic location of the user terminal and predefined geographic cluster or cell boundaries.

205 — Obtain power demand of each cluster upon a satellite needed to communicate with all user terminals in each cluster.

210 — Assign to each cluster two power demands representing the power required of the two satellites having the least power demanded by the users terminal.

215 — Determine power demand ratios (PDR's) for each cluster where the PDR equals (power demand of a first satellite)/(power demand of a second satellite), and store the PDR's in a cluster distribution table.

220 — Generate a distribution table of satellite pairs which jointly cover one or more clusters, whereby the distribution table uniquely maps each satellite pair and cluster to a corresponding PDR.

225 — Sort the satellite distribution table according to each satellite joint pair, and their corresponding common clusters, with the common clusters listed in order of increasing PDR.

230 — Generate a satellite/cluster assignment column by initially assigning each cluster to one of the satellites in each satellite pair based on an assignment criteria.

| Lower # Satellite in Joint Pair | Higher # Satellite in Joint Pair | Common Cluster | Cluster PDR | Initial Cluster Satellite Assgt. |
|---|---|---|---|---|
| 1 | 12 | 55 | 0.75 | 1 |
|   |   | 50 | 1.25 | 12 |
|   |   | 60 | 2.00 | 12 |

FIG. 4

METHOD FOR BALANCING DEMAND BETWEEN SATELLITES IN A TELECOMMUNICATIONS SYSTEM

FIELD OF THE INVENTION

The present invention generally relates to the field of satellite based telecommunications. More specifically, the invention relates to a method for balancing output power demands within a constellation of satellites.

BACKGROUND OF THE INVENTION

Today, satellite systems exist for supporting telecommunications with fixed and mobile user terminals. Satellite based telecommunications systems, such as Odyssey (as proposed by the assignee of the present application), utilize a constellation of satellites to relay communications signals between user terminals and earth or base stations. The user terminals are assigned to earth stations. The earth stations direct calls to and from the assigned user terminals. The user terminals and associated earth stations communicate along preassigned communications channels having a preassigned bandwidth (subband) centered about a carrier frequency. The satellites support a separate communications channel for each user terminal. To maintain a channel, the satellite must transmit RF signals to the earth station and user terminal at sufficient power to maintain a desired quality of service. Each satellite must adjust its power output or "demand" to ensure that an outgoing communications signal is emitted with sufficient power to be received by the user station while not wasting power by transmitting at an unnecessarily high level. Therefore, the power demand upon a satellite is dependent upon the number of user terminals (e.g., channels) it supports.

Satellites in a telecommunications system may be configured to provide substantially continuous single or double coverage of desired hemispheric regions or of the entire world. An example of one such system is disclosed in U.S. Pat. No. 5,433,726, assigned to the assignee of the present invention. The '726 patent is expressly incorporated herein by reference in its entirety. To effect such coverage, the satellites afford overlapping coverage areas whereby a user in the overlapping coverage area may be assigned to one of two or more satellites. By way of example only, when a user terminal is in the field of view of two satellites, the user terminal may be assigned to the satellite capable of maintaining the longest or strongest communications length prior to handing the user terminal to a new satellite.

However such an assignment scheme may result in a non-optimal satellite power allocation of users whereby the total power demand upon one satellite is significantly less than the demand upon another satellite. Therefore, a need remains within the satellite telecommunications field for an improved satellite loading technique to distribute power demands efficiently and evenly among the satellites in a constellation.

OBJECTS OF THE INVENTION

An object of the present invention is to provide an efficient and rapid method for assigning user terminals to satellites in order to achieve an optimal power demand distribution across the satellite constellation.

Another object of the present invention is to initialize the user terminal distribution to minimize the total system power requirement by assigning a user terminal or cluster of terminals jointly covered by more than one satellite to the satellite that requires the least amount of power to communicate with that user terminal or cluster.

Another object of the present invention is to reassign selected user terminals or clusters, in overlap regions, from a satellite having a higher power demand to a satellite having a lower-power demand.

It is a corollary object of the present invention to reassign user terminals or clusters in such a way as to minimize the increase in power demand upon one satellite while maximizing the decrease in power demand upon a second satellite.

It is yet another object of the present invention to minimize the increase in the overall power demand on the satellite constellation during reassignment.

Another object of the present invention is to minimize the maximum power required of any satellite and the total amount of over-power demand on the satellite constellation.

These and other objectives and features of the invention will become apparent from the following more detailed description, taken in conjunction with the accompanying drawings, which illustrate, by way of example, the principles of the invention.

BRIEF DESCRIPTION OF THE DRAWINGS

FIG. 4 illustrates an exemplary data table generated by the preferred embodiment while following the steps in FIG. 3.

DETAILED DESCRIPTION OF THE PREFERRED EMBODIMENT

Figure 1:
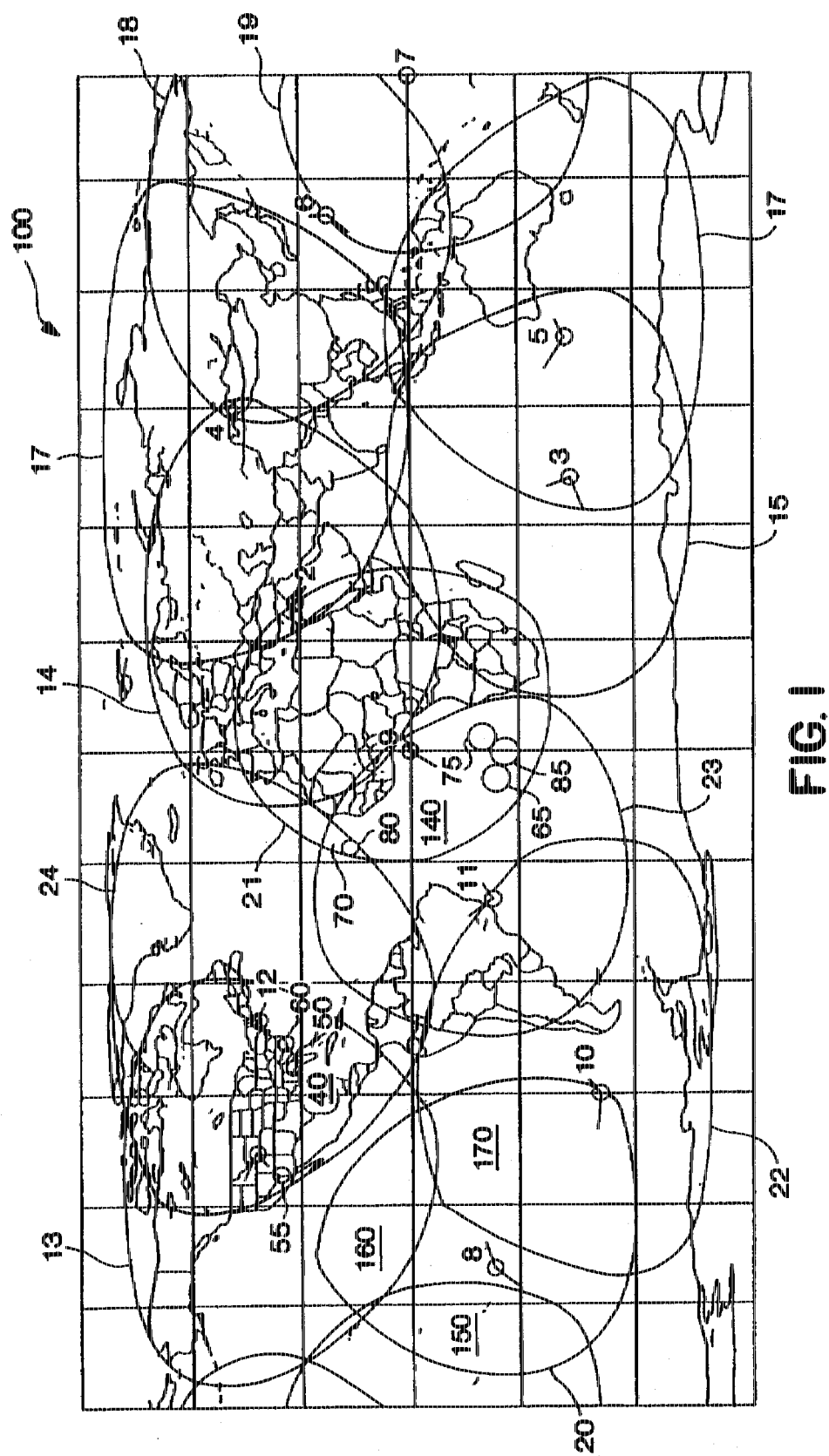
FIG. 1 illustrates a top plan view of a satellite coverage snapshot of the earth.

FIG. 1 illustrates an exemplary satellite constellation 100 containing 12 satellites. Each satellite includes a corresponding "footprint" or coverage area which passes across the earth as the satellites orbit. Satellite 1 has a footprint 13 which covers most of the United States. Thus, satellite 1 communicates with the user terminals in the U.S. located within its footprint 13. Similarly, satellite 12 has a footprint 24 that covers parts of North and South America. At this instant in time shown by FIG. 1, the footprints 13 and 24 or coverage areas of satellites 1 and 12 have a significant overlapping coverage area 40. Accordingly, the user terminals located in overlapping coverage area 40 may be assigned to communicate with satellite 1 or satellite 12.

Satellites 9 and 11 are located over Africa and South America, respectively. Satellites 9 and 11 have footprints 21 and 23, respectively. Footprints 21 and 23 have an overlapping coverage area 140. Accordingly, user terminals located in the overlapping coverage area 140 may be assigned to satellite 9 or satellite 11.

For purposes of explanation, the following description is provided primarily with respect to clusters of user terminals. A "cluster" represents all user terminals within a predefined geographic region or cell fixed to cover a preassigned region on the earth. User terminals may be fixed within a cell or mobile. It is understood that the present invention is equally useful on an individual user terminal basis.

FIG. 1 illustrates user clusters 50, 55, and 60 in the overlapping coverage area 40, and clusters 65, 75 and 85 in overlapping coverage area 140. While the illustrative geographic size of the user clusters is rather large, in practice, there is no limit on how small or large a user cluster may be. As explained below, the present invention assigns clusters 50, 55, and 60 to satellite 1 or 12 and clusters 65, 75 and 85 to satellite 9 or 11 so as to optimally balance the power load of satellites 1, 9, 11 and 12.

Optionally, the processing sequence of the preferred embodiment may be carried out by a system operating center having a mainframe computer which communicates with every earth station through land lines. The earth stations may receive power demand information from each satellite in a manner described in a co-pending application entitled "Power Control Method and Apparatus for Satellite Based Telecommunications Systems", U.S. patent application Ser. No. 08/640,198 filed on Apr. 30, 1996, and assigned to the assignee of the present application. The earth stations may communicate in the manner described in a co-pending application entitled "Earth Station Subsystem", U.S. patent application Ser. No. 08/653,606 filed on May 13, 1996, and assigned to the assignee of the present application. The above referenced applications are expressly incorporated by reference in their entirety.

Figure 2:
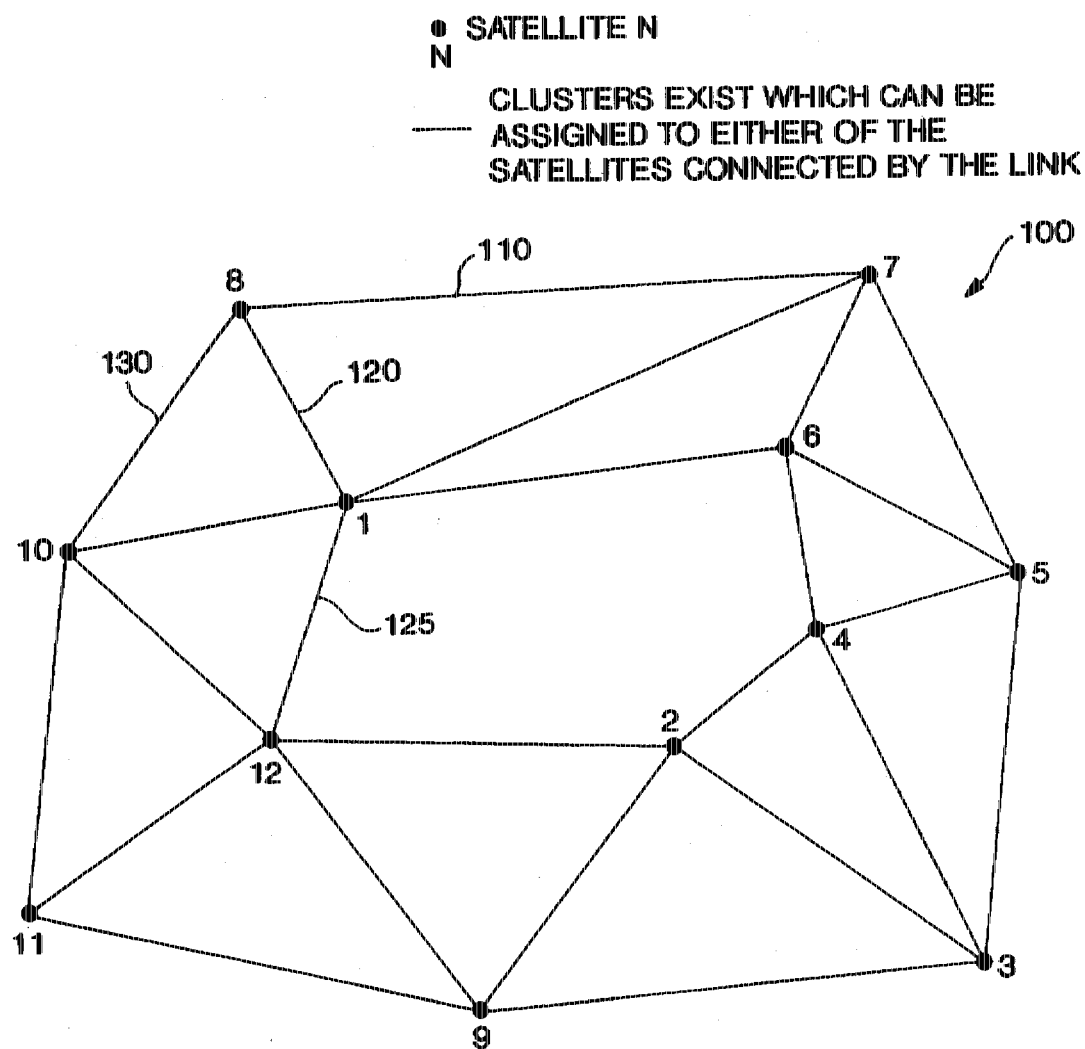
FIG. 2 illustrates a satellite point diagram utilized by the preferred embodiment to model the satellite coverage snapshot of FIG. 1.

FIG. 2 illustrates a satellite constellation model generated by the system operations center (SOC) based on the satellite coverage snapshot of FIG. 1. Each point or node in FIG. 2 corresponds to one of the satellites from satellite constellation 100. The lines connecting the satellite points represent the overlapping coverage areas between the connected satellites. As explained below, the system operations center identifies, for each connecting line, clusters (in the associated overlapping coverage area) which can be assigned to either of the satellites connected by the line. For example, satellite 8 is connected to satellites 7, 1, and 10 by lines 110, 120, and 130, respectively. Thus, line 110 represents the overlapping coverage area 150 (see FIG. 1) shared by the footprints of satellites 8 and 7 in which the user clusters in overlapping coverage area 150 can be assigned to either satellite. Similarly, line 120 represents the overlapping coverage area 160 shared by the footprints of satellites 8 and 9. Line 130 represents the overlapping coverage area 170 shared by the footprints of satellites 8 and 10. Finally, line 125 represent overlapping coverage area 140 (FIG. 1) in which clusters 50, 55 and 60 reside The process of the preferred embodiment may include the following steps: (1) obtain a satellite coverage snapshot at the satellite operations center (e.g., FIG. 1); (2) identify the satellites with overlapping coverage areas (e.g., FIG. 2); (3) identify the user clusters located in the overlapping coverage areas; (4) initially assign the user clusters located in overlapping coverage areas to one of the covering satellites (e.g. the satellite that requires the least amount of power to communicate with the user clusters or randomly); (5) reassign clusters (or portions thereof) to other satellites so as to efficiently balance the power load on the satellite constellation system; and (6) repeat the process at regular time intervals to maintain an efficient power balance. The method is set forth in more detail below.

Figure 3:
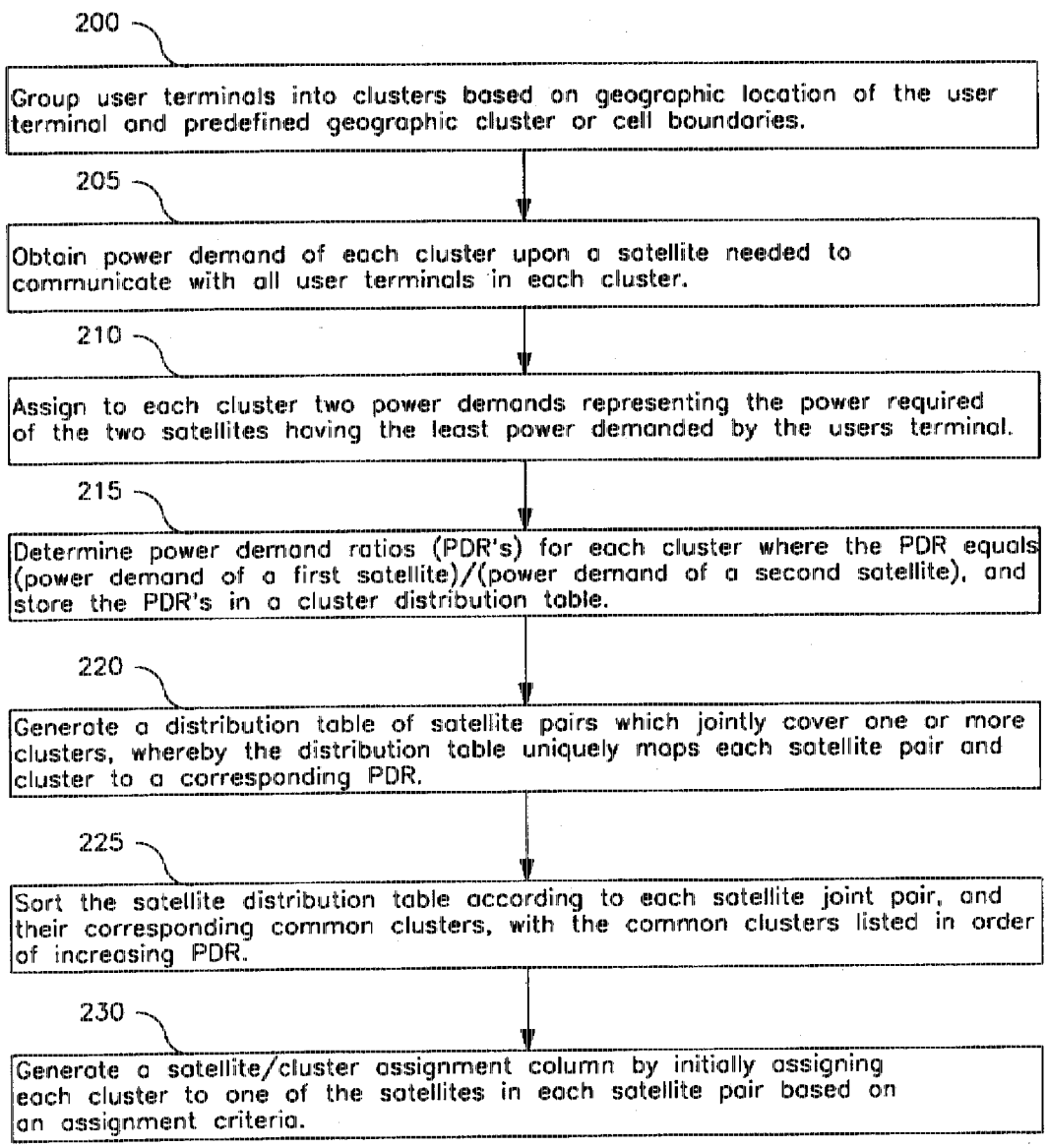
FIG. 3 illustrates a flow diagram of the processing sequence followed by the preferred embodiment.

With reference to FIG. 3, at step 200, the system operations center (SOC) groups all user terminals into user clusters based on the geographic location of the user terminal with respect to predefined geographic cluster or cell boundaries. Once the SOC processor defines the user clusters, (or before step 200) the processor obtains a satellite coverage snapshot (as in FIG. 1) for an instant in time. Each user terminal remains grouped in its current geographic user cluster for all subsequent load balancing calculations until a new snapshot is obtained.

Next, in step 205, the processor determines the satellite power demand necessary to communicate with a corresponding user cluster within its footprint (or coverage area). In step 210, the processor generates an array of power demands for each user cluster covered by more than one satellite (hereinafter a "common cluster"). For purposes of illustration only, if more than two satellites cover a user cluster, power demands are assigned for the cluster with respect to two of the satellites, such as the two satellites having the highest elevation angle with respect to the user terminals in the user cluster.

After the list of power demands for common clusters has been assigned, the processor calculates (step 215) a power demand ratio for each common cluster based on the list. The "power demand ratio" or "PDR" equals:

$$\frac{\text{power demand of the lower-numbered satellite}}{\text{power demand of the higher-numbered satellite}}$$

The "number" of each satellite represents a predetermined unique number assigned to each satellite in the satellite constellation (e.g., numbers 1–12 in FIG. 1). The PDR for each common cluster is then stored in a cluster distribution table.

Optionally, the Cluster Distribution Table (CDT) may include an array of common cluster elements. Each common cluster element may be indexed by the satellite identifiers (numbers) of the pair of overlapping satellites (referred to hereinafter as a "satellite joint pair"). Satellite joint pairs jointly cover one or more user clusters. Each element of the Cluster Distribution Table may identify a satellite joint pair, the common clusters covered by the satellite joint pair, and the PDR value for a corresponding common cluster covered by the satellite joint pair. The common clusters may be listed in order of decreasing or increasing PDR value. Ordering the common clusters by PDR value facilitates an efficient search for the "Best Cluster" for reassignment (explained in more detail below). In addition, the Cluster Distribution Table may have a satellite/common cluster assignment column indicating the satellite to which the common cluster is initially assigned. For instance, the processor may initially assign a common cluster to the satellite in the satellite joint pair that uses the least power to communicate with the common cluster (see step 230). By initially assigning the common clusters to the satellites that use the least power, the processor minimizes initial total power demand on the entire satellite constellation.

An example is provided hereafter in connection with the joint satellite pair, satellites 1 and 12 with common clusters 50, 55, and 60. For the example, assume the following power demand requirements on satellites 1 and 12 to communicate with all of the user terminals in each of the common clusters 50, 55, and 60:

|              | Satellite 1 | Satellite 12 |
|--------------|-------------|--------------|
| common cluster 50 | 5 W | 4 W |
| common cluster 55 | 3 W | 4 W |
| common cluster 60 | 4 W | 2 W |

At step 205 the power demands listed above are obtained based on power information supplied from the earth stations covered by the satellite. Clusters 50, 55 and 60 are only covered by two satellites, and thus step 210 need not be applied. Thus, control passes to the next step, at which the processor obtains the following PDR value for each common cluster:

| common cluster 50 | PDR = 5/4 = 1.25 |
| common cluster 55 | PDR = 3/4 = 0.75 |
| common cluster 60 | PDR = 4/2 = 2.00 |

The PDR values are stored in the Cluster Distribution Table (FIG. 4) at steps 215 and 220. The table is sorted by PDR values in ascending order at step 225. At step 230, the clusters are initially assigned and these satellite assignments are stored in the Cluster Satellite Assignment column of the table. Cluster 55 is initially assigned to satellite 1, because it demands less power from satellite 1 (3 W) than from satellite 12 (4 W). Clusters 50 and 60 are initially assigned to satellite 12 because they demand less power from satellite 12 than from satellite 1 to maintain communications links with a desired quality of service. If the power demands of a cluster on each satellite in the covering satellite joint pair are equal, then the cluster may be arbitrarily assigned to either satellite in the satellite joint pair. As an option, the cluster may be assigned to the lower-numbered satellite in the satellite joint pair.

While the example described above is with respect to a single satellite pair it is understood that every satellite joint pair, and their corresponding common clusters, must be so analyzed and organized.

As stated above, by initially assigning the common clusters to the satellites from which the clusters will demand the least power, the initial total power requirement for the satellite constellation is minimized. However, while the total power demand on the constellation may be at a minimum, the power balance across the satellites may not be optimal. For example, satellite 12 of satellite joint pair 1 and 12 may be assigned the majority of common clusters shared by the joint satellite pair because satellite 12 is more centrally located over the high demand clusters (the east coast of the United States) and thus expends less power communicating with any individual cluster. However, as a result, the total power demand on satellite 12 is much higher than the total power demand on satellite 1. Thus, it may be desirable to shift some of the common clusters (or portions thereof) assigned to satellite 12 to satellite 1.

Figure 5A:
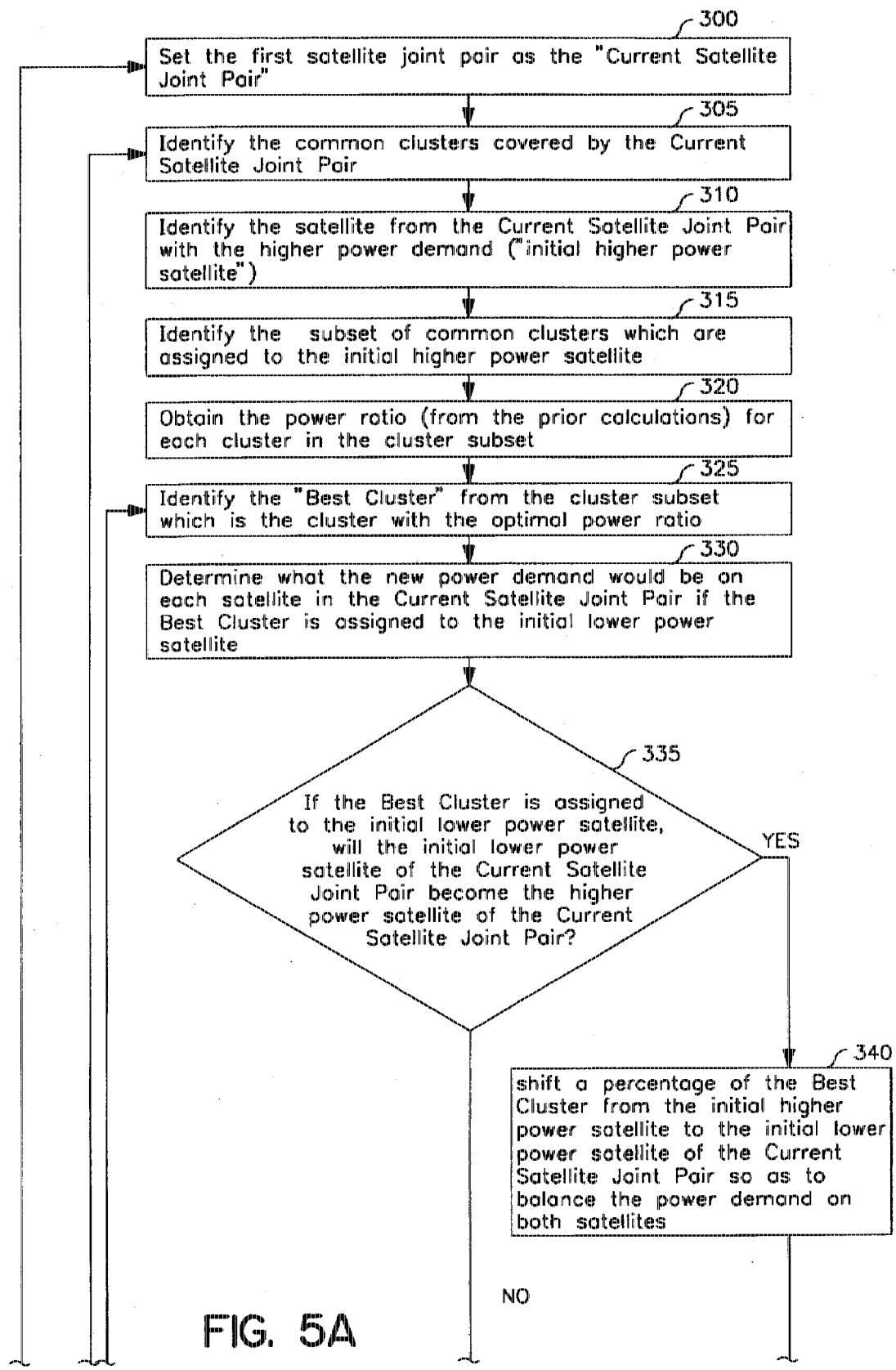
FIGS. 5A and 5B illustrate a flow diagram of the processing flow of the preferred embodiment for optimally ressigning user terminals or terminal clusters in a satellite constellation according to the present invention.
Figure 5B:
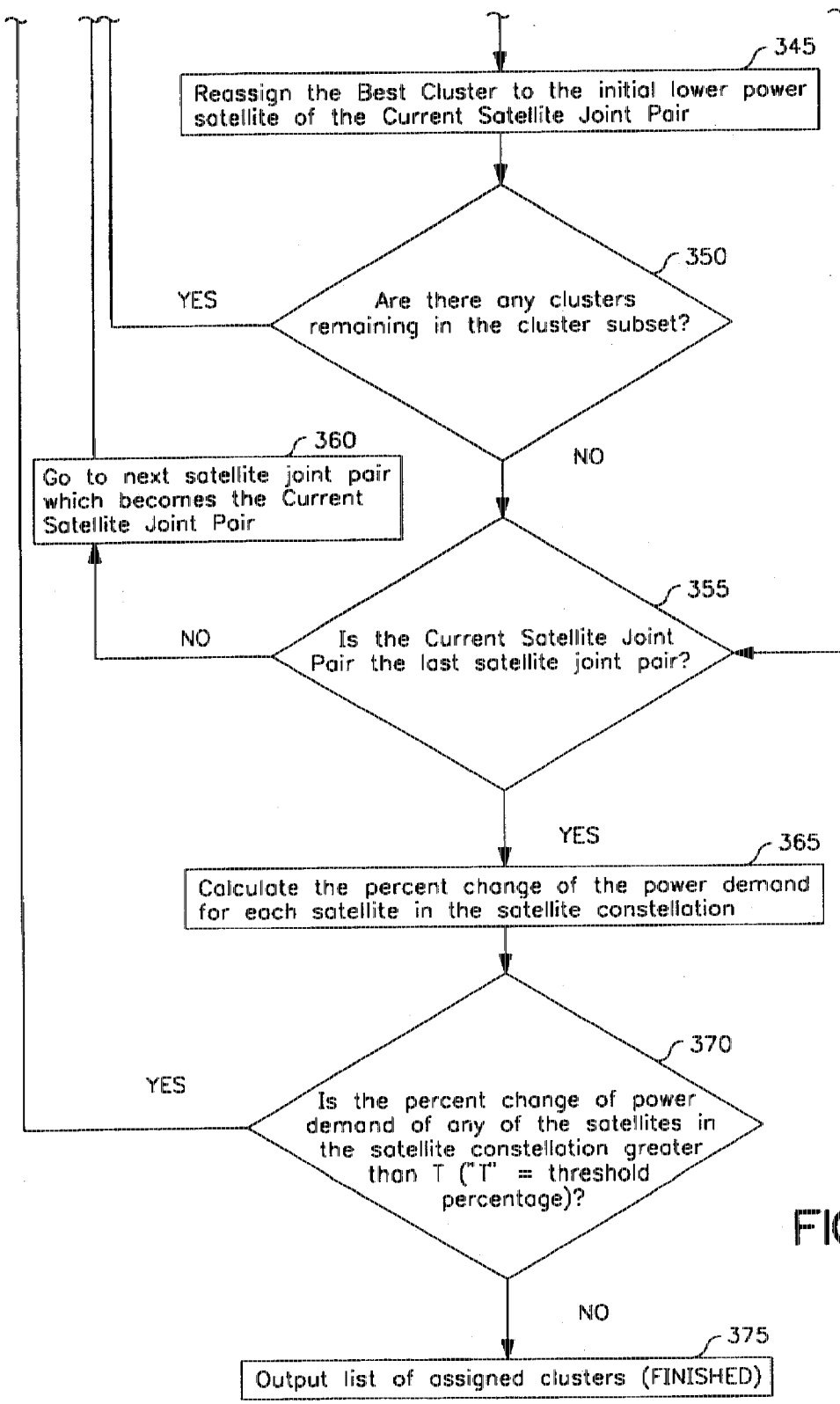

FIGS. 5A and 5B set forth a method for optimally reassigning common clusters from higher power satellites (satellite 12 in the example) to lower power satellites (satellite 1 in the example) in the satellite joint pairs of a satellite constellation. First, in step 300, the first satellite joint pair of the satellite constellation 100 is set as the Current Satellite Joint Pair. Although not required, the preferred method is to begin with satellite 1 and determine with which other satellites it has overlapping coverage areas, starting with the lowest numbered satellite. Thus, based on the model of FIG. 2, the processor analyzes the satellite joint pair 1 and 2 to determine whether any clusters should be reassigned. Next, the processor analyzes satellite joint pair 1 and 3 and then satellites 1 and 11, followed by satellites 1 and 12. The remaining satellite joint pairs are analyzed in the same fashion.

After setting the Current Satellite Joint Pair in step 300, at step 305, the processor identifies all of the common clusters shared by the Current Satellite Joint Pair. In other words, the processor identifies the user clusters located in the overlapping coverage area of the Current Satellite Joint Pair. At step 310, the processor identifies which satellite of the Current Satellite Joint Pair has the higher power demand. As stated above, this measurement is made after the initial assignment of common clusters in step 230 of FIG. 3. For discussion purposes, the higher power satellite of the Current Satellite Joint Pair may be identified as satellite $S_H$, while the lower power satellite of the Current Satellite Joint Pair will be identified as satellite $S_L$.

To transfer some of the power load demanded of satellite $S_H$ to satellite $S_L$, only the common clusters presently assigned to satellite $S_H$ need be considered for reassignment. Thus, at step 315, the processor identifies the subset of common clusters of the Current Satellite Joint Pair that are assigned to satellite $S_H$ (hereinafter the "Cluster Subset"). Then, at step 320 the processor obtains the PDR values for each common cluster in the Cluster Subset (which were previously calculated at step 220 of FIG. 3).

Typically, the Current Satellite Joint Pair includes more than one common cluster in the Cluster Subset. Thus, the processor must determine which common cluster in the Cluster Subset is the "Best Cluster" to reassign from satellite $S_H$ to satellite $S_L$. The "Best Cluster" is the cluster that is reassigned from satellite $S_H$ to satellite $S_L$ in such a way that the added power required of satellite $S_L$ is as small as possible per unit of power subtracted from satellite $S_H$. In other words, in reassigning the common cluster, the increase in the overall power demand on the satellite constellation 100 is minimized. The Best Cluster is identified in step 325.

While the processor may locate the Best Cluster in several ways, one simple method involves using the data tables as shown in FIG. 4. The table in FIG. 4 lists all of the common clusters for a satellite joint pair in increasing PDR value. Optionally, the common clusters with a PDR value of less than 1 are initially assigned to the lower numbered satellite. The common clusters with a PDR greater than 1 may be initially assigned to the higher numbered satellite. Thus, if satellite $S_H$ is the lower numbered satellite of the Current Satellite Joint Pair, the processor can find the Best Cluster by starting at the bottom of the list and searching upward until the first cluster assigned to the lower numbered satellite ($S_H$) is found. Likewise, if satellite $S_H$ is the higher numbered satellite of the Current Satellite Joint Pair, the processor can find the Best Cluster by starting at the top of the list and searching downward until locating the first common cluster assigned to the higher numbered satellite ($S_H$). This linear method for finding the Best Cluster is efficient when the list of common clusters is small. Other methods for locating the Best Cluster also may be used, such as a binary method, particularly if the list of common clusters is large.

After locating the Best Cluster of the Cluster Subset in step 325, at step 330 the processor calculates the new power demand on satellite $S_H$ and satellite $S_L$ of the Current Satellite Joint Pair if the Best Cluster were reassigned from satellite $S_H$ to satellite $S_L$. At step 335 the processor determines whether the new power demand would cause the power demand of the satellite $S_L$ to exceed the power demand of the satellite $S_H$. If so, then the processor determines that the entire Best Cluster should not be reassigned to satellite $S_L$ since this reassignment would not achieve equal balancing of the power demand on each satellite in the Current Satellite Joint Pair. Thus, the processor reassigns only a portion of the Best Cluster to satellite $S_L$ (see step 340) so as to balance the power load on $S_H$ and $S_L$. The processor may use several techniques for determining the exact percentage of user terminals from the Best Cluster to be reassigned, including using an interpolation process. After balancing satellite $S_H$ and satellite $S_L$, the processor moves to the next Satellite Joint Pair, that is, if any Satellite Joint Pairs remain unprocessed (moves to step 355).

Returning to step 335, if the reassignment of the Best Cluster from satellite $S_H$ to satellite $S_L$ will not make satellite $S_L$ the higher power satellite, then the processor assigns the entire Best Cluster to satellite $S_L$ (step 345). Next, the processor at step 350 determines if any further common clusters remain in the cluster subset. If so, the processor determines a new Best Cluster from the remaining Cluster Subsets and repeats steps 325–350. If there are no remaining common clusters in the cluster subset, then no further balancing between satellite $S_H$ and satellite $S_L$ can be achieved and flow proceeds to the next satellite joint pair (see step 355). The aforementioned process is then repeated if the current Satellite Joint Pair is not the last pair. After the process has been completed for every satellite joint pair in the satellite constellation 100, the processor performs a test to determine if the power load on the entire satellite constellation has been efficiently balanced. The power demand on each satellite in the satellite constellation 100 may not be exactly equal after one iteration. Thus, multiple iterations may be performed. Every time the reassignment method of FIGS. 5A and 5B is repeated, the satellites in the constellation 100 may be placed into two categories: those satellites whose cluster assignments changed and those whose cluster assignments were unchanged. The reassignment method will lower the power demand on the highest-demanded-power satellite in the first category, while leaving the power demand on the satellites in the second category unchanged. Ultimately, the method reaches a point where the marginal decrease in the power demand of the highest power satellite is small relative to the additional time required to reassign more clusters. Thus, a threshold level is set by the processor. When the threshold is met the balancing process ends. The processor performs the threshold test in steps 365 and 370 by analyzing the percent change in power demand for every satellite in the satellite constellation 100 after completion of the reassignment method of FIGS. 5A and 5B. In step 365, the processor calculates the percent change of the power demand for each satellite. As shown in step 370, if the percent change for any satellite in the satellite constellation 100 exceeds a certain threshold percentage "T," then the method of FIGS. 5A and 5B should be repeated for the entire satellite constellation. However, if no percent change in power demand exceeds T, then the efficient balancing is complete and the list of assigned clusters is final (step 375). A sample value of T may be 1%, but the value of the threshold percentage T will vary depending on the satellite constellation.

Since the satellites are constantly moving, and their corresponding coverage areas are constantly changing, the power balance achieved by the above described process is only temporary. Thus, the balancing method may be repeated at regular intervals of time. At each interval, a new satellite coverage snapshot must be taken and the above method repeated. The length of the time interval varies with the satellite constellation.

Alternatively, the preferred embodiment may be modified to minimize the total amount of over-power demand on the satellite constellation 100. At times, the power demand on certain satellites may exceed the satellites' power capability. To minimize the amount of over-power demand on the system, the process reassigns common clusters from an over-powered satellite to an under-powered satellite in a satellite joint pair. This alternative embodiment proceeds exactly as the preferred embodiment and adds an additional step after it. The additional step includes an examination of all satellite joint pairs in which both satellites are over-powered. User clusters are reassigned to the satellite from which they demand the lesser power, unless such a reassignment would cause either of the satellites to become under-powered. This final step reduces the total over-power demand on the constellation 100.

It is understood that some user clusters may be covered by more than two satellites. For example, footprints 13, 23, and 24 of satellites 9, 11, and 12, respectively, have an overlapping coverage area 70 containing user cluster 80. Thus, the user cluster 80 in overlapping coverage area 70 may be assigned to satellite 1, 11, or 12. While the preferred embodiment of the present invention assigns user clusters to one of two satellites, the preferred embodiment may be modified to reassign clusters between any number of overlapping satellites representing an "overlapping satellite set". When the overlapping satellite set includes more than two satellites, the power demand ratio may be modified accordingly to indicate a ratio of power demands upon multiple satellites. In this modified form the power demand ratio may represent a single ratio which is a function of power demands upon all of the satellites in the overlapping satellite set. Alternatively, the power demand ratio may represent multiple ratios, each of which corresponds to a satellite pair within the overlapping satellite set.

While the preferred embodiment assigns clusters initially based on power demand, optionally, the clusters may be initially assigned based on coverage duration. Thus, each cluster may be initially assigned to the satellite which will maintain the longest connection with the cluster (e.g., the arriving satellite). As a further alternative, the cluster may be initially assigned based on elevation angle (e.g., to the satellite having the highest elevation angle). Also, the clusters may be initially assigned based on historic stored cluster assignment data (e.g., assign the cluster to the same satellite that it was assigned to yesterday at the same time). As yet a further alternative, when the coverage snapshot is obtained, each cluster may remain assigned to the satellite that it was assigned to prior to the snapshot.

While the preferred embodiment is described in connection with clusters of users, it may be implemented with respect to individual user terminals.

It is understood that FIG. 1 merely is a coverage "snapshot" that shows the footprints of the satellites at a single instant in time. Because the satellites are constantly moving, their footprints (and the covered user clusters) are constantly changing. Notwithstanding such movement, the preferred embodiment processes during each iteration the data from a single snapshot in order to load efficiently the satellite constellation 100. A new snapshot and the method of the preferred embodiment are repeated at regular time intervals to maintain an efficient power balance.

Although the preferred embodiments of the invention have been shown and described, it will be apparent that other adaptations and modifications can be made to the disclosed method without departing from the spirit and scope of the invention. Accordingly, the invention is not to be limited, except as by the following claims.

We claim:

1. A method for balancing power demands between a constellation of satellites in a satellite based telecommunication system, the method comprising the steps of:

obtaining power demands by user clusters upon satellites covering associated user clusters, each power demand representing a power required of a satellite to maintain at least one communications link with a user cluster in an associated satellite coverage area;

identifying overlapping satellite sets of satellites having coverage areas which overlap user clusters, wherein each overlapping satellite set includes at least first and second satellites;

calculating at least one power ratio for each user cluster associated with an overlapping satellite set, wherein each power ratio represents a ratio between power demands upon at least two satellites in the overlapping satellite set by a single common cluster in an associated overlapping coverage area; and for each overlapping satellite set, determining whether the satellites have unbalanced power demands with respect to other satellites in the overlapping satellite set; and balancing power demands upon satellites in each overlapping satellite set by assigning user clusters in the overlapping coverage region to satellites based on said power ratios.

2. A method according to claim 1, wherein said determining and balancing steps are repeated for each overlapping satellite set.

3. A method according to claim 1, wherein said balancing step includes reassigning user clusters from a high power demand satellite to a low power demand satellite.

4. A method according to claim 1, wherein said balancing step includes reassigning user terminals within a user cluster from a high power demand satellite to a low power demand satellite.

5. A method according to claim 1, wherein said identifying step generates a cluster distribution table including a plurality of elements, each element of which maintains a unique association between a overlapping satellite set, a corresponding user cluster and an associated power demand ratio, and wherein said determining and balancing steps are performed for each element in the cluster distribution table.

6. A method according to claim 1, further comprising the step of repeating said determining and balancing steps with respect to subsets of each of said user clusters.

7. A method according to claim 1, further comprising the steps of:

loading all of said user clusters into a cluster distribution table which uniquely maps each user cluster and corresponding overlapping satellite set to a corresponding power demand ratio value; and comparing a subset of power demand ratio values within said cluster distribution table to obtain a best candidate to be assigned to a lower power demand satellite.

8. A method according to claim 1, further comprising the steps of:

after said balancing step, recalculating a power demand ratio for the user clusters; and repeating said determining and balancing steps when a change in a power demand of at least one overlapping satellite set exceeds a predefined power change threshold.

9. A method according to claim 1, further comprising the steps of:

assigning each user cluster initially to the first satellite in a corresponding overlapping satellite set.

10. A method according to claim 9, further comprising the steps of:

determining whether a user cluster demands less power from the first satellite than from the second satellite; and when the user cluster demands more power from the first satellite than from the second satellite, reassigning the user cluster to the second satellite.

11. A method according to claim 1, further comprising the steps of:

assigning each user cluster initially to a satellite in a corresponding overlapping satellite set from which the user cluster demands the least power.

12. A method according to claim 11, further comprising the steps of:

determining the satellites in each overlapping satellite set which have the highest and lowest total power demands;

identifying a subset of user clusters, in the overlapping coverage area, assigned to the satellite with the highest total power demand; and assigning at least one user cluster, from the subset of user clusters, to the satellite with the lowest total power demand.

* * * * *